(12) United States Patent
Popper et al.

(10) Patent No.: US 8,512,885 B2
(45) Date of Patent: Aug. 20, 2013

(54) BATTERY AND METHOD OF USE

(75) Inventors: Richard S. Popper, Scottsdale, AZ (US); Jensen Jorgensen, Scottsdale, AZ (US)

(73) Assignee: XGlow P/T, LLC, Scottsdale, AZ (US)

( * ) Notice: Subject to any disclaimer, the term of this patent is extended or adjusted under 35 U.S.C. 154(b) by 0 days.

(21) Appl. No.: 13/536,721

(22) Filed: Jun. 28, 2012

(65) Prior Publication Data

US 2013/0182421 A1    Jul. 18, 2013

Related U.S. Application Data

(60) Provisional application No. 61/586,196, filed on Jan. 13, 2012.

(51) Int. Cl.
*H01M 2/30* (2006.01)
(52) U.S. Cl.
USPC ............. 429/1; 429/163; 429/164; 429/178
(58) Field of Classification Search
USPC .................................................. 429/1
See application file for complete search history.

(56) References Cited

U.S. PATENT DOCUMENTS

| | | | |
|---|---|---|---|
| 1,373,801 A | 4/1921 | Deems | |
| 4,360,574 A | 11/1982 | Park | |
| 5,104,752 A * | 4/1992 | Baughman et al. | 429/1 |
| 5,146,149 A * | 9/1992 | Nilssen | 320/112 |
| 5,478,668 A | 12/1995 | Gozdz et al. | |
| 7,608,366 B2 | 10/2009 | Suzuki et al. | |
| 2002/0122978 A1* | 9/2002 | Setliff | 429/178 |
| 2003/0143455 A1* | 7/2003 | Partington et al. | 429/97 |
| 2005/0271935 A1* | 12/2005 | Fleming et al. | 429/160 |
| 2007/0253194 A1* | 11/2007 | Sharrah et al. | 362/183 |
| 2008/0217078 A1* | 9/2008 | Kobayashi et al. | 180/65.1 |
| 2009/0297950 A1 | 12/2009 | Zhao | |
| 2010/0081046 A1 | 4/2010 | Davis | |

* cited by examiner

*Primary Examiner* — Ula C Ruddock
*Assistant Examiner* — Tony Chuo
(74) *Attorney, Agent, or Firm* — Stephen C. Beuerle; Procopio Cory Hargreaves & Savitch LLP

(57) ABSTRACT

A battery includes a battery case including battery chemistry for supplying electricity, a first end, and a second end opposite the first end; a first positive terminal, a first negative terminal, and a first insulator therebetween at the first end that together form a first positive terminal and negative terminal configuration; a second positive terminal, a second negative terminal, and a second insulator therebetween at the second end that together form a second positive terminal and negative terminal configuration, wherein the second positive terminal and the second negative terminal configuration is a mirror image of the first positive terminal and the first negative terminal configuration.

13 Claims, 2 Drawing Sheets

BATTERY AND METHOD OF USE

CROSS-REFERENCE TO RELATED APPLICATION

This application claims the benefit of provisional application No. 61/586,196, filed on Jan. 13, 2012, which is hereby incorporated herein by reference.

FIELD OF THE INVENTION

The present invention relates to batteries and to battery circuits.

BACKGROUND OF THE INVENTION

A typical battery has two terminals. One terminal is marked (+), or positive, and the other is marked (−), or negative. In normal flashlight batteries, such as conventional AA, C or D cell batteries, the terminals are located at the opposed ends of the battery. To harness the electric charge produced by a battery, the battery must be connected to a load, such as a light bulb, a motor, or an electrical circuit.

The internal workings of a battery are housed within a metal or plastic case. Inside this case are a cathode, which connects to the positive terminal, and a corresponding anode, which connects to the negative terminal. These components, which are electrodes, occupy most of the space in a battery and are the place where the chemical reactions occur to produce electricity. An insulator or separator creates a barrier between the cathode and anode isolating the cathode from the anode preventing the electrodes from touching while allowing electrical charge to flow freely between them. The medium that allows the electric charge to flow between the cathode and anode is known as the electrolyte. A collector conducts the charge to the outside of the battery and through the applied load.

When a load completes the circuit between the positive and negative terminals, the battery produces electricity through a series of electromagnetic reactions between the anode, the cathode, and the electrolyte. The anode experiences an oxidation in which two or more ions from the electrolyte combine with the anode, producing a compound and releasing one or more electrons. At the same time, the cathode goes through a reduction reaction, in which the cathode substance, ions, and free electrons also combine to form compounds. The reaction in the anode creates electrons, the reaction in the cathode absorbs them, and the net product is electricity. The battery will continue to produce electricity until one or both of the electrodes run out of the substance necessary for the reactions to occur. Modern batteries use a variety of chemicals to power their reactions. Common battery chemistries include zinc-carbon batteries, alkaline batteries, lithium-ion batteries, and lead-acid batteries.

The zinc-carbon chemistry of zinc-carbon batteries is common in many inexpensive AAA, AA, C, and D dry cell batteries, in which the anode is zinc, the cathode is manganese dioxide, and the electrolyte is ammonium chloride or zinc chloride. The chemistry of alkaline batteries is also common in AA, C, and D dry cell batteries. In alkaline batteries, the cathode is composed of a manganese dioxide mixture, the anode is a zinc powder, and the electrolyte is potassium hydroxide, which is an alkaline substance. The lithium chemistry of lithium-ion batteries is often used in high-performance devices, such as cell phones, digital cameras, and electric cars. Lithium-ion batteries are rechargeable, and a variety of substances are used in lithium batteries, and a common combination is a lithium cobalt oxide cathode and a corresponding carbon anode. Lead-acid batteries are also rechargeable, and the corresponding chemistry, which is used in conventional car batteries, includes lead dioxide and metallic lead for the electrodes, and a sulfuric acid solution for the electrolyte. The most common form of rechargeable battery is the lithium-ion battery.

With the rise of portable electronic devices, such as laptops, cell phones, flashlights, cordless power tools, and the like, the need for rechargeable batteries has grown substantially in recent years. Many portable electronic devices that use rechargeable batteries incorporate one contact region for an operating circuit for operating the load, and a second contact point for a charging circuit used to recharge the battery. The operating circuit operates separately from the charging circuit. This is normally achieved by using either a battery cradle that contains the necessary circuits, or an inner barrel inside the body of the electronic device to carry the extra current. Although both methods are effective, they add extra weight and increased cost in the product of the electronic devices and in some instances make it inconvenient and cumbersome to remove or replace a battery as may be necessary from time-to-time. Given these and other deficiencies in the art of batteries, the need for continued improvement in the field is evident.

SUMMARY OF THE INVENTION

An aspect of the invention involves a battery having a battery case including battery chemistry for supplying electricity, a first end, and a second end opposite the first end; a first positive terminal, a first negative terminal, and a first insulator therebetween at the first end that together form a first positive terminal and negative terminal configuration; a second positive terminal, a second negative terminal, and a second insulator therebetween at the second end that together form a second positive terminal and negative terminal configuration, wherein the second positive terminal and the second negative terminal configuration is a minor image of the first positive terminal and the first negative terminal configuration.

One or more implementations of the aspect of the invention described immediately above include one or more of the following: the battery is rechargeable; the battery chemistry lithium-ion chemistry; the battery chemistry is zinc-carbon chemistry; the battery chemistry is lead-acid chemistry; the battery chemistry is alkaline chemistry; the battery is elongated and cylindrical in shape; the first positive terminal and the second positive terminal are circular, located at a geometric center of the first and second ends, and are symmetrical about a longitudinal axis of the battery, the first and second insulators are continuous circular rings, encircle the first and second positive terminals, are located between the first and second positive terminals and the first and second negative terminals, and are symmetrical about the longitudinal axis of the battery, and first and second negative terminals are continuous circular rings that concurrently encircle first and second separators and first and second positive terminal, and are symmetrical about the longitudinal axis of the battery, the first and second positive terminals, the first and second negative terminals, and first and second insulators are concentric and share the longitudinal axis as a common center; a first load connected to the first positive terminal and the first negative terminal at the first end and a second load connected to the second positive terminal and the second negative terminal at the second end; a load connected to the first positive terminal and the first negative terminal at the first end and a charger connected to the second positive terminal and the second negative terminal at the second end; a first charger connected to the first positive terminal and the first negative terminal at the first end and a second charger connected to the second positive terminal and the second negative terminal at the second end; a battery-powered electronic device comprising a body; and a load carried by the body and powered by the battery; a charger coupled to the battery to charge the battery; the battery-powered electronic device is a portable flashlight, the body is a handle of the flashlight, the load is a lamp of the flashlight, and the battery is carried in the handle of the flashlight; a charger coupled to the battery to charge the battery; a battery-powered electronic device including a body and a load carried by the body and powered by the battery, comprising: receiving a first battery in the battery-powered electronic device, the first battery having the construction of the battery and being disposed in a first orientation with the second positive terminal and second negative terminal configuration facing in one direction and the first positive terminal and first negative terminal configuration facing in an opposite direction; replacing the first battery with a second battery in the battery-powered electronic device, the second battery having the construction of the battery of claim 1 and being disposed in a second orientation opposite the first orientation; a method of using a battery-powered electronic device including a body and a load carried by the body and powered by the battery, comprising: receiving a first battery in the battery-powered electronic device, the first battery having the construction of the battery and being disposed in a first orientation with the second positive terminal and second negative terminal configuration facing in one direction and the first positive terminal and first negative terminal configuration facing in an opposite direction; receiving a second battery in the battery-powered electronic device adjacent to the first battery and in direct series connection therewith, the second battery having the construction of the battery of claim 1 and being disposed in a second orientation opposite of the first orientation.

DETAILED DESCRIPTION OF THE PREFERRED EMBODIMENTS

Figure 1:
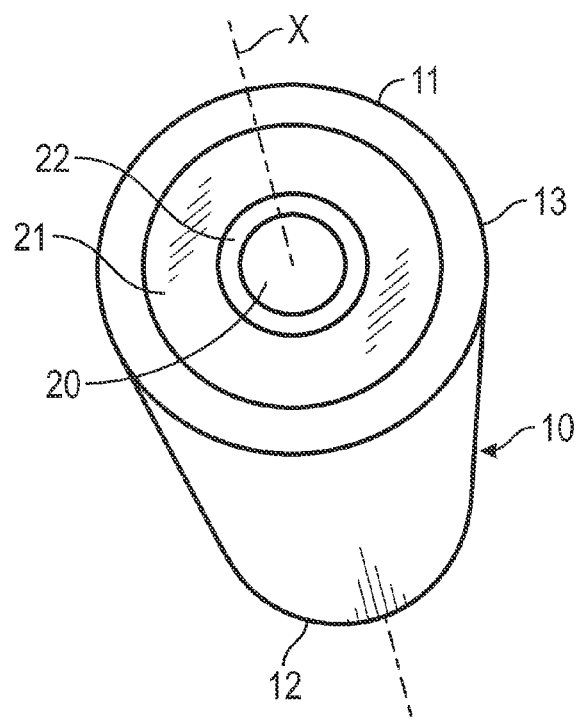
FIG. 1 is a perspective of a battery constructed and arranged in accordance with the principle of the invention.
Figure 2:
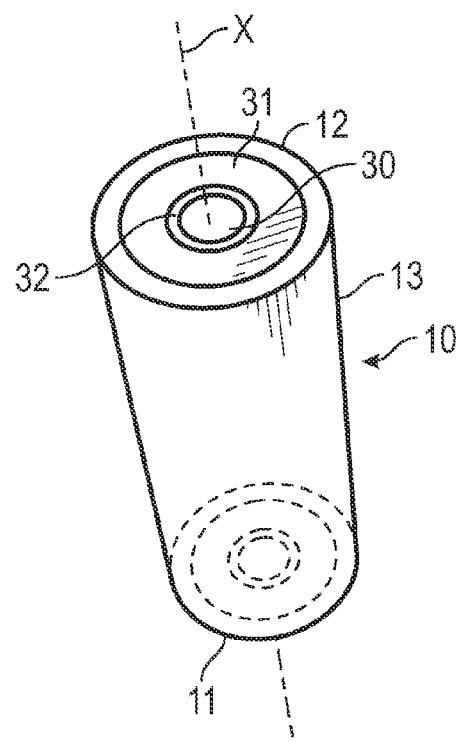
FIG. 2 is another perspective view of the battery of FIG. 1.

Turning now to the drawings, in which like reference characters indicate corresponding elements throughout the several views, attention is first directed to FIGS. 1 and 2 in which there is seen a battery 10 constructed and arranged in accordance with the principle of the invention. Battery 10 is elongate and cylindrical in shape, has opposed ends 11 and 12, and is symmetrical along its central, longitudinal axis X extending centrally through battery 10 from end 11 to end 12. The internal workings of battery 10 are housed within a metal or plastic case 13, which extends along the length of battery 10 from end 11 to end 12. End 11 of battery 10 as illustrated in FIG. 1 is formed with a positive terminal denoted at 20 and a negative terminal denoted at 21, and end 12 of battery 10 as shown in FIG. 2 is formed with a positive terminal denoted at 30 and a negative terminal denoted at 31. Positive and negative terminals 20 and 21 are located at end 11 of battery 10, and positive and negative terminals 30 and 31 are located at end 12 of battery 10. Positive terminal 20 and negative terminal 21 at end 11 of battery 10 are separated by an insulator or separator 22 at end 11 of battery 10 that electrically isolates positive terminal 20 from negative terminal 21. Positive terminal 30 and negative terminal 31 at end 12 of battery 10 are separated by an insulator or separator 32 at end 11 of battery 10 that electrically isolates positive terminal 30 from negative terminal 31.

As seen in FIG. 1, positive terminal 20 is circular, is located at the geometric center of end 11 of battery 10, and is symmetrical about longitudinal axis X of battery 10. Separator 22 is a continuous circular ring, encircles positive terminal 20, and is, like positive terminal 20, symmetrical about longitudinal axis X of battery 10. Separator 22 is located between positive terminal 20 and negative terminal 21. Negative terminal 21 is located distally of positive terminal 20 and separator 22, is a continuous circular ring that concurrently encircles separator 22 and positive terminal 20, and is, like positive terminal 20 and separator 22, symmetrical about longitudinal axis X of battery 10. Positive terminal 20, negative terminal 21, and separator 22 at end 11 of battery 10 are concentric in arrangement in that they encircle and share a common center, namely, longitudinal axis X of battery 10.

As seen in FIG. 2, positive terminal 30 is circular, is located at the geometric center of end 12 of battery 10, and is symmetrical about longitudinal axis X of battery 10. Separator 32 is a continuous circular ring, encircles positive terminal 30, and is, like positive terminal 30, symmetrical about longitudinal axis X of battery 10. Separator 32 is located between positive terminal 30 and negative terminal 31. Negative terminal 31 is located distally of positive terminal 30 and separator 32, is a continuous circular ring that concurrently encircles separator 32 and positive terminal 30, and is, like positive terminal 30 and separator 32, symmetrical about longitudinal axis X of battery 10. Positive terminal 30, negative terminal 31, and separator 32 at end 12 of battery 10 are concentric in arrangement in that they encircle and share a common center, namely, longitudinal axis X of battery 10.

Positive terminal 30 at end 12 of battery 10 is identical in size and shape to positive terminal 20 at end 11 of battery 10, negative terminal 31 at end 12 of battery 10 is identical in size and shape to positive terminal 21 at end 11 of battery 10, and separator 32 at end 12 of battery 10 is identical in size and shape to separator 22 at end 11 of battery 10. The arrangement and geometry of positive and negative terminals 30 and 31 and separator 32 at end 12 of battery 10 is identical to or otherwise the minor image of the arrangement and geometry of positive and negative terminals 20 and 21 and separator 22 at end 11 of battery 11.

The internal workings of battery 10 inside case 13 are not shown as they are conventional. As with a conventional battery, inside case 13 are a cathode that connects to opposed positive terminals 20 and 30, and a corresponding anode that connects to opposed negative terminals 21 and 31. These components, which are electrodes, occupy most of the space in battery 10 and are the place where the chemical reactions occur to produce electricity. An insulator or separator creates a barrier between the cathode and anode isolating the cathode from the anode preventing the electrodes from touching while allowing electrical charge to flow freely between them. In a preferred embodiment, separators 22 and 32 form part of the separator separating the cathode from the anode. However, the separator separating the cathode from the anode can be different from separators 22 and 32 in an alternate embodiment. The medium that allows the electric charge to flow between the cathode and the anode is the electrolyte, and, as in a conventional battery a collector conducts the charge to the outside of the battery and through the applied load. Battery 10 is a rechargeable battery, and preferably utilized lithium chemistry to power its reactions to produce electricity. The lithium chemistry used by the battery 10 preferably includes lithium cobalt oxide for the cathode, and carbon for the corresponding anode.

Because both ends 11 and 12 of battery 10 have positive and negative terminals according to the principle of the invention, harnessing the electric charge produced by battery 10 can be produced at end 11 of battery 10 with positive and negative electrodes 20 and 21, and can also be identically produced at end 12 of battery with positive and negative electrodes 30 and 31. Recharging battery 10 can also be made at end 11 of battery 10 with positive and negative electrodes 20 and 21, and can further be identically made at end 12 of battery with positive and negative electrodes 30 and 31.

Figure 3:
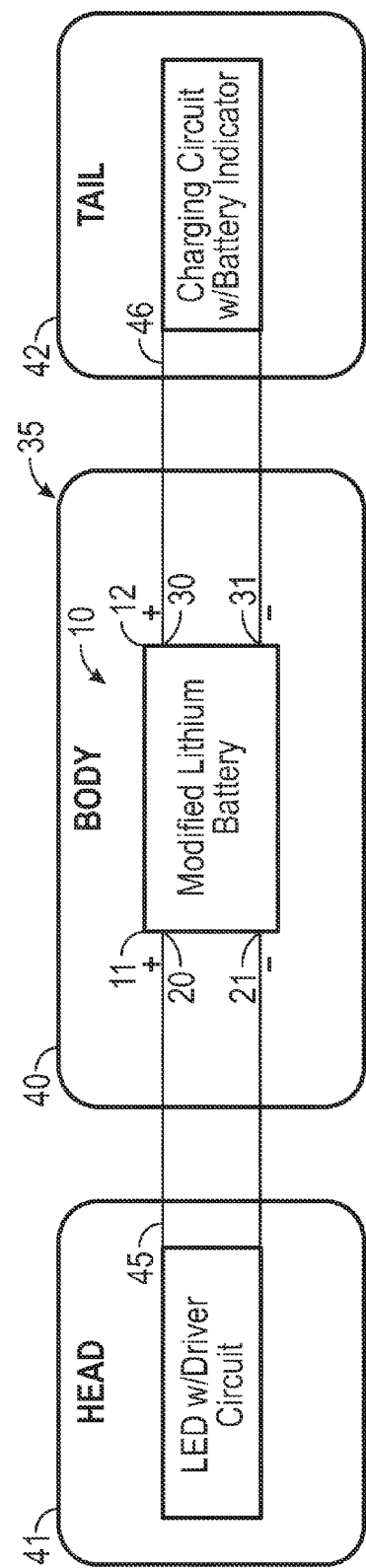
FIG. 3 is a schematic diagram of the battery of FIGS. 1 and 2 incorporated into a battery-powered electronic device having a load component and a charging component, and further illustrating a load circuit for powering the load component formed between one end of the battery and the load component, and a charging circuit for charging the battery formed between the opposed end of the battery and the charging component.

As a matter of example, FIG. 3 is a schematic diagram of battery 10 incorporated into a body 40 of a battery-powered electronic device 35 having a load component 41 and a charging component 42, a load circuit 45 for powering load component 41 formed between end 11 of battery 10 and load component 41, and a charging circuit 46 for charging battery 10 formed between end 12 of battery 10 and charging component 42. In FIG. 3, positive and negative terminals at end 11 of battery 10 are denoted generally at 20 and 21, respectively, and are shown as they would appear connected to load component 41 forming or otherwise completing load circuit 45 between load component 41 and positive and negative terminals 20 and 21 at end 11 of battery 10 causing battery 10 to produce electric power for powering load component 41. Positive and negative terminals at end 12 of battery 10 are denoted generally at 30 and 31, respectively, and are shown as they would appear connected to charging component 42 forming or otherwise completing charging circuit 46 between charging component 42 and positive and negative terminals 30 and 31 at end 11 of battery 10 causing battery 10 to receive charging energy from charging component 42 for charging battery 10. Because the positive and negative terminal geometry and configuration is the same at ends 11 and 12 of battery 10, the orientation of battery 10 in body 40 of battery-powered electronic device 35 can be reversed for forming load circuit 45 between load component 41 and positive and negative terminals 30 and 31 at end 12 of battery 10, and for forming charging circuit 46 between charging component 42 and positive and negative terminals 20 and 21 at end 11 of battery 10, in accordance with the principle of the invention. Regardless of the position of battery 10 in the battery receptacle of body 40, whether end 11 to load component 41 and end 12 to charging component 42 or end 11 to charging component 42 and end 12 to load component, the positive and negative terminal geometry and configuration at ends 11 and 12 of battery 10 are able to produce the corresponding load and charging circuits 45 and 46, in accordance with the principle of the invention. In FIG. 3, battery-powered electronic device 35 is generally representative of a portable flashlight, where body 40 is the body of the flashlight, load component 41 is the lamp of the flashlight, and charging component 42 is the charging cap of the flashlight. Battery 10 can be similarly used in other portable electronic devices having corresponding load and charging components.

By providing battery 10 with identical positive and negative terminals at ends 11 and 12, the need for incorporating dedicated load and charging contacts and circuits, a battery cradle wired with dedicated load and charging circuitry, or an inner barrel to carry the extra current in a battery-powered electronic device is no longer necessary, which reduces the overall weight and cost of a battery-powered electronic device. Furthermore, because the positive and negative terminals at ends 11 and 12 of battery 10 are identical, battery 10 may be installed into a battery cradle or receptacle of a battery-powered electronic device simply and efficiently without the need to find the correct way of inserting the battery as it can be inserted both ways or otherwise in either direction. This is especially useful when a battery needs to be replaced urgently and quickly, such as in the dark. In the present embodiment, terminals 20 and 30 are positive and terminals 21 and 31 are negative, and this can be reversed if so desired.

While illustrative embodiments of the invention are disclosed herein, it will be appreciated that numerous modifications and other embodiments can be devised by those skilled in the art. Features of the embodiments described herein, can be combined, separated, interchanged, and/or rearranged to generate other embodiments. Therefore, it will be understood that the appended claims are intended to cover all such modifications and embodiments that come within the spirit and scope of the present invention.

What is claimed:

1. A battery comprising:
    a battery case including battery chemistry for supplying electricity, a first and a second end opposite the first end;
    a first positive terminal, a first negative terminal, and a first insulator therebetween, aligned at least substantially concentrically, at the first end, that together form a first positive terminal and a negative terminal configuration;
    a second positive terminal, a second negative terminal, and a second insulator therebetween, aligned at least substantially concentrically, at the second end, that together form a second positive terminal and a negative terminal configuration; and,
    the second positive terminal and the second negative terminal configuration is a mirror image of the first positive terminal and the first negative terminal configuration.

2. The battery of claim 1, wherein the battery is rechargeable.

3. The battery of claim 1, wherein the battery chemistry is lithium-ion chemistry.

4. The battery of claim 1, wherein the battery chemistry is zinc-carbon chemistry.

5. The battery of claim 1, wherein the battery chemistry is lead-acid chemistry.

6. The battery of claim 1, wherein the battery chemistry is alkaline chemistry.

7. The battery of claim 1, wherein the battery chemistry is elongated and cylindrical in shape.

8. The battery of claim 1, wherein the first positive terminal and the second positive terminal are circular, located at a geometric center of the first and second ends, and are symmetrical about a longitudinal axis of the battery, the first and second insulators are continuous circular rings, encircle the first and second positive terminals, are located between the first and second positive terminals and the first and second negative terminals, and are symmetrical about the longitudinal axis of the battery, and first and second negative terminals are continuous circular rings that concurrently encircle the first and second insulators and the first and second positive terminals, and are symmetrical about the longitudinal axis of the battery, the first and second positive terminals, the first and second negative terminals, and the first and second insulators are concentric and share the longitudinal axis as a common center.

9. The battery of claim 1, further including a load connected to the first positive terminal and the first negative terminal at the first end and a charger connected to the second positive terminal and the second negative terminal at the second end.

10. A battery-powered electronic device, comprising:
a body; and
a load carried by the body and powered by the battery of claim 1.

11. The battery-powered electronic device of claim 10, further including a charger coupled to the battery to charge the battery.

12. The battery-powered electronic device of claim 10, wherein the battery-powered electronic device is a portable flashlight, the body is a handle of the flashlight, the load is a lamp of the flashlight, and the battery is carried in the handle of the flashlight.

13. The battery-powered electronic device of claim 12, further including a charger coupled to the battery to charge the battery.

* * * * *